United States Patent
Takahashi et al.

(10) Patent No.: US 7,326,491 B2
(45) Date of Patent: Feb. 5, 2008

(54) ELECTROCHEMICAL DEVICE

(75) Inventors: Tetsuya Takahashi, Tokyo (JP); Yoshihiko Ohashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/390,111

(22) Filed: Mar. 28, 2006

(65) Prior Publication Data

US 2006/0222935 A1    Oct. 5, 2006

(30) Foreign Application Priority Data

Mar. 30, 2005    (JP) ................ P2005-098532

(51) Int. Cl.
  *H01M 2/18* (2006.01)
  *H01M 2/20* (2006.01)
(52) U.S. Cl. ............. 429/143; 429/129; 429/211
(58) Field of Classification Search ........ 429/53–54, 429/72, 82, 128, 180–181, 211, 65, 121, 178, 429/245, 247; 29/623.1
See application file for complete search history.

(56) References Cited

U.S. PATENT DOCUMENTS 4,271,757 A * 6/1981 Maxwell et al. .......... 101/37
6,432,577 B1 * 8/2002 Shul et al. ............... 429/162
2001/0051298 A1 * 12/2001 Hanafusa et al. ......... 429/162
2002/0028377 A1 * 3/2002 Gross ..................... 429/129
2004/0161669 A1 * 8/2004 Zolotnik et al. ......... 429/233
2006/0127751 A1 * 6/2006 Woo ...................... 429/128

FOREIGN PATENT DOCUMENTS

| EP | 1 180 480 A1 | 2/2002 |
| JP | A-2000-252175 | 9/2000 |
| WO | WO 01/59855 A1 | 8/2001 |
| WO | WO 2004/088691 A1 | 10/2004 |

\* cited by examiner

*Primary Examiner*—Susy Tsang-Foster
*Assistant Examiner*—Fatou G. Maiga
(74) *Attorney, Agent, or Firm*—Oliff & Berridge PLC

(57) ABSTRACT

An electrochemical device comprises collector plates having main parts and tab parts and being arranged such that the main parts oppose each other; a separator having a main part and a tab part and being arranged such that the main part is disposed between the main parts of the collector plates while the tab part projects out from between the main parts of the collector plates; an active material layer formed on each of the main parts of the collector plates and in contact with the separator; an electrolyte in contact with each active material layer; and an insulative fixing member securing the tab parts of the collector plates and the tab part of the separator to each other.

2 Claims, 9 Drawing Sheets

Fig.9

|  | ESR [Ω] | CAPACITY [F] | HOLDING VOLTAGE [V] | ELECTRIC DOUBLE LAYER CAPACITOR THICKNESS [μm] |
|---|---|---|---|---|
| EXAMPLE1 | 2.3 | 0.051 | 1.760 | 492 |
|  | 2.3 | 0.051 | 1.700 | 495 |
|  | 2.3 | 0.051 | 1.820 | 491 |
|  | 2.3 | 0.051 | 1.710 | 494 |
|  | 2.3 | 0.051 | 1.680 | 491 |
| COMPARATIVE EXAMPLE1 | 2.3 | 0.050 | 1.740 | 494 |
|  | 0.1 | - | - | 495 |
|  | 2.3 | 0.051 | 1.800 | 492 |
|  | 2.4 | 0.049 | 1.700 | 492 |
|  | 2.3 | 0.050 | 1.760 | 493 |
| COMPARATIVE EXAMPLE2 | 2.2 | 0.051 | 1.480 | 605 |
|  | 2.1 | 0.051 | 1.200 | 604 |
|  | 2.1 | 0.051 | 1.360 | 606 |
|  | 2.2 | 0.051 | 1.390 | 603 |
|  | 2.1 | 0.051 | 1.240 | 604 |

ELECTROCHEMICAL DEVICE

BACKGROUND OF THE INVENTION

1. Field of the Invention

The present invention relates to an electrochemical device.

2. Related Background Art

Electrochemical devices such as lithium-ion secondary batteries and electric double layer capacitors often include a multilayer body in which separators and collector plates each having an active material layer are repeatedly laminated. For manufacturing such an electrochemical device, it is necessary for the collector plates and separators to be secured to each other in order to improve the handling of the multilayer body.

The separators and collector plates have conventionally been secured to each other by laminating the separators and collector plates after coating their surfaces with a bonding resin, or wrapping the outer periphery of the laminate of separators and collector plates with one round of an adhesive tape. (See Japanese Patent Application Laid-Open No. 2000-252175).

SUMMARY OF THE INVENTION

When a surface of an active material layer or separator is coated with a bonding resin or the like, however, ions of the electrolyte are inhibited from migrating and so forth in this part, whereby rises in internal-resistance and the like occur. On the other hand, wrapping the outside of the multilayer body with the adhesive tape increases the thickness of the multilayer body, thereby contradicting the demand for thinning the electrochemical device.

In view of the problem mentioned above, it is an object of the present invention to provide an electrochemical device which can be made thinner and keep internal resistance from increasing while having a multilayer body which is easy to handle.

The electrochemical device in accordance with the present invention comprises a pair of collector plates, a separator, an active material layer, an electrolyte, and a fixing member.

The pair of collector plates each have a main part and a tab part and are arranged such that the main parts thereof oppose each other.

The separator has a main part and a tab part, and is arranged such that the main part thereof is disposed between the main parts of the pair of collector plates while the tab part of the separator projects out from between the main parts of the pair of collector plates.

The active material layer is formed on the main part of each collector plate and is in contact with the separator.

The electrolyte is in contact with each active material layer.

The fixing member is insulative and secures the tab part of each collector plate and the tab part of the separator to each other.

In the present invention, the fixing member secures the separator and each collector plate to each other. This makes it easier to handle the multilayer body including the separator and collector plates at the time of manufacture.

The fixing member secures the tab parts of the collector plates to the tab part of the separator. Therefore, the fixing member does not reduce the area of interfaces between the active material layers and separator, so that ions in the electrolyte are less likely to be inhibited from migrating and so forth, whereby the electrochemical device can lower its internal resistance. Thus configured fixing member is hard to affect the thickness of the multilayer body or electrochemical device, and thus can contribute to thinning the electrochemical device.

Preferably, the fixing member has a form kept from overlapping the main parts of the collector plates when the electrochemical device is viewed in the laminating direction of the collector plates.

In this case, the multilayer body in which the collector plates, active material layers, and separator are laminated can easily be subjected to a process of heat-pressing the main parts of the collector plates in the laminating direction. Such heat pressing contributes to suppressing the internal resistance, since unnecessary spaces are less likely to occur between the active material layers and separator.

Preferably, the fixing member is bonded to the tab part of each collector plate and the tab part of the separator. When the fixing member is bonded to these tab parts, the tab parts are secured to each other, whereby even a small fixing member can reliably secure the tag parts.

Preferably, in this case, the fixing member is made of a thermoplastic resin. This makes it easy for the fixing member to be bonded to the tab parts of the collector plates and the tab part of the separator by thermal fusion.

Preferably, leads are connected to the respective tab parts of the collector plates, and the fixing member further covers the leads.

A multilayer body including collector plates having leads connected to tab parts, active material layers, and a separator are often sealed into a case. Here, the surface of a lead may be clad with a cover made of a resin or the like so as to improve the airtightness between the case and the lead before bonding the cover and the case to each other. In the present invention, the fixing member further covers the lead and thus can also act as the cover for the lead, which is favorable in terms of economy.

Preferably, the fixing member comprises two sheets, bonded to each other, opposing each other in the laminating direction of the collector plates, while holding the tab parts of the pair of collector plates and the tab part of the separator between the sheets. Such a fixing member is easy to perform a fixing operation.

Preferably, at least three collector plates are provided; the collector plates are stacked such that the main parts thereof oppose each other while the respective tab parts thereof are alternately aligned in two rows; separators are arranged such that the main parts thereof are placed between the main parts of the collector plates while the tab parts of the separators project out from between the main parts of the collector plates; respective active material layers are formed on the main parts of the collector plates; the tab parts of the separators project to a gap between the two rows of the tab parts of the collector plates; and the fixing member secures the tab parts of the collector plates and the tab parts of the separators to each other.

This realizes an electrochemical device having a multilayer laminate structure. Since the tab parts of the collector plates align in two rows while the tab parts of the separators are arranged between the two rows of the tab parts of the collector plates, a small fixing member can secure the tab parts of the collector plates and the tab parts of the separators to each other.

Here, it will be preferred if the tab parts of the separators have a width smaller than the gap between the two rows of the tab parts of the collector plates.

When the tab parts of the separators have a width smaller than the gap between the two rows of the tab parts of the collector plates, the tab parts of the separators are not held between the vertically stacked tab parts of the collector plates in each row. Therefore, even when the tab parts of the collector plates are made shorter, the upper and lower tab parts of the collector plates in each row can electrically be connected to each other. This facilitates connections with leads, and is extremely suitable for an electrochemical device in which unit cells are connected in parallel.

The present invention can provide an electrochemical device which can be made thinner and keep internal resistance from increasing while having a multilayer body which is easy to handle.

BRIEF DESCRIPTION OF THE DRAWINGS

FIG. 9 is a table showing characteristics of the electric double layer capacitors in accordance with Example 1 and Comparative Examples 1 and 2.

DESCRIPTION OF THE PREFERRED EMBODIMENTS

First Embodiment

To begin with, an embodiment of the electric double layer capacitor (electrochemical device) in accordance with the present invention will be explained in detail.

Figure 1:
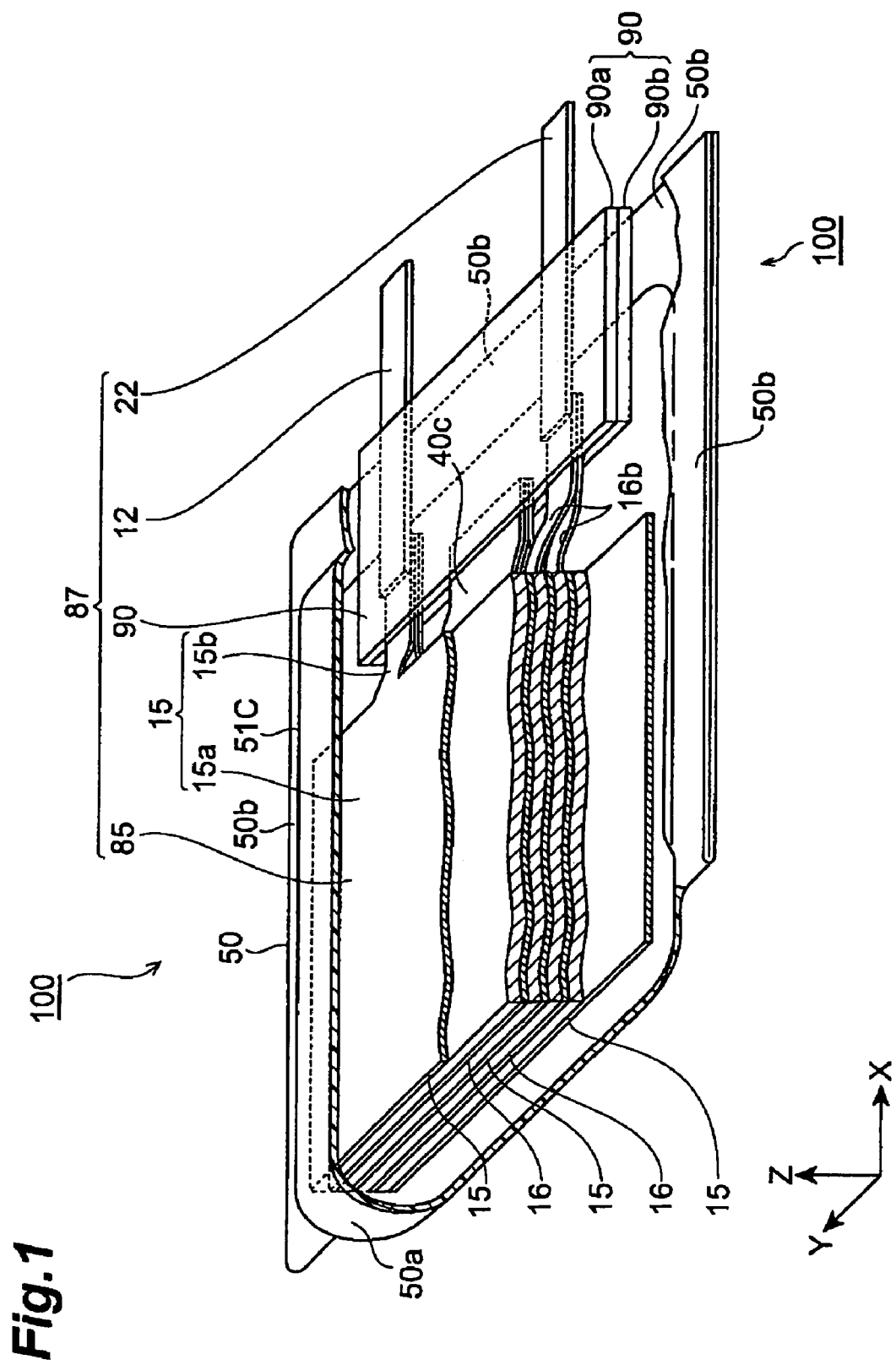
FIG. 1 is a partly broken perspective view showing the electric double layer capacitor in accordance with an embodiment.
Figure 2:
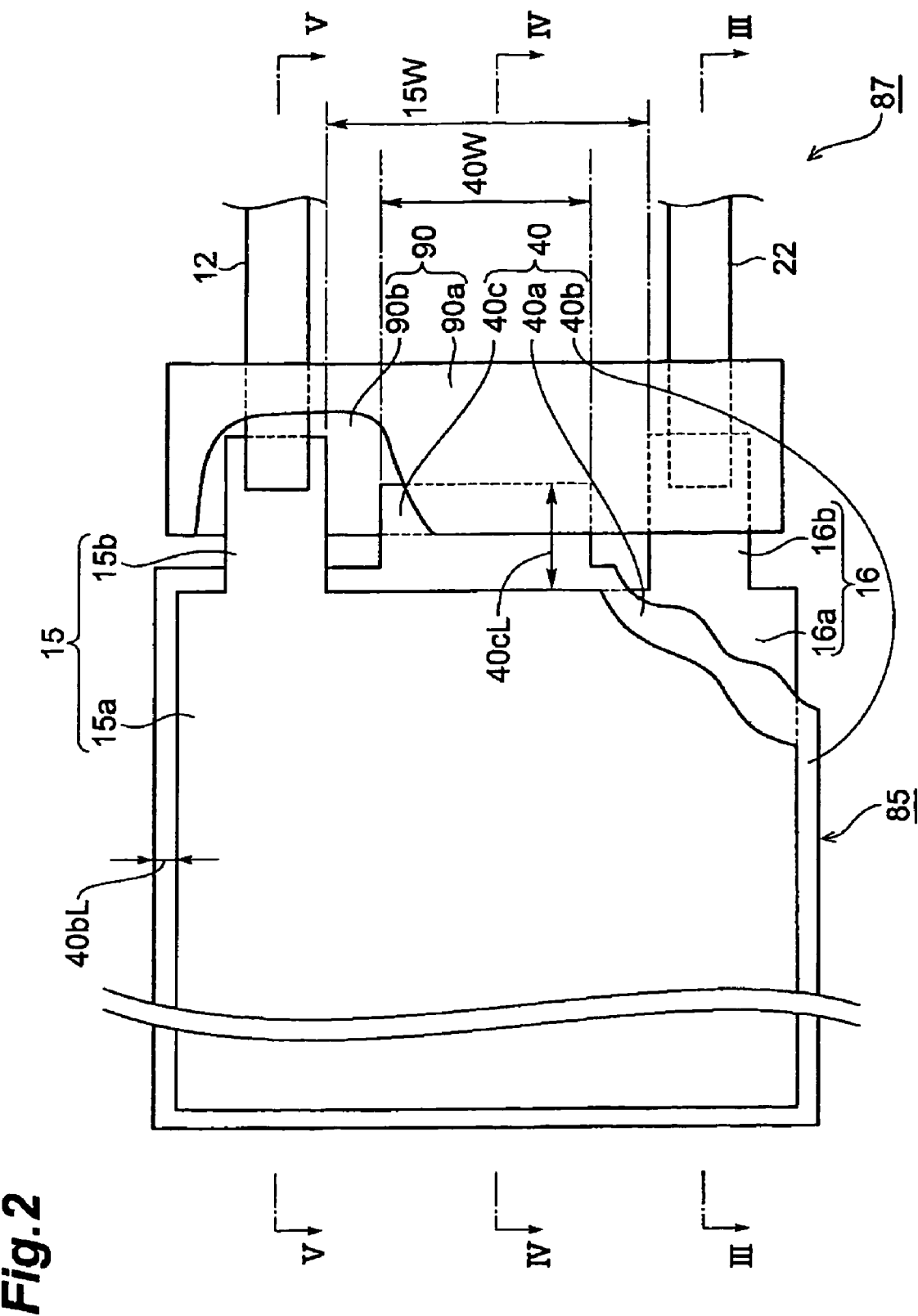
FIG. 2 is a partly broken plan view of the multilayer structure in the lithium-ion secondary battery of FIG. 1.
Figure 3:
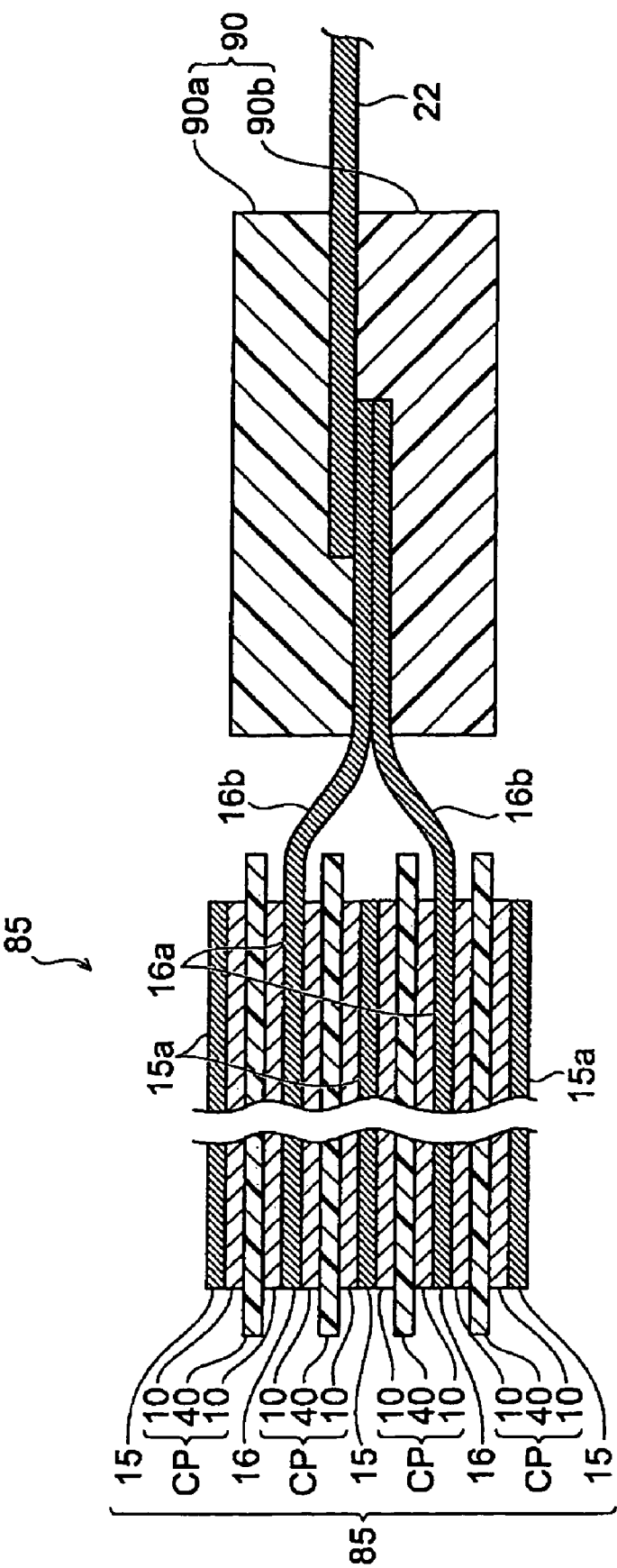
FIG. 3 is a schematic sectional view of the multilayer structure taken along the line III-III of FIG. 2.
Figure 4:
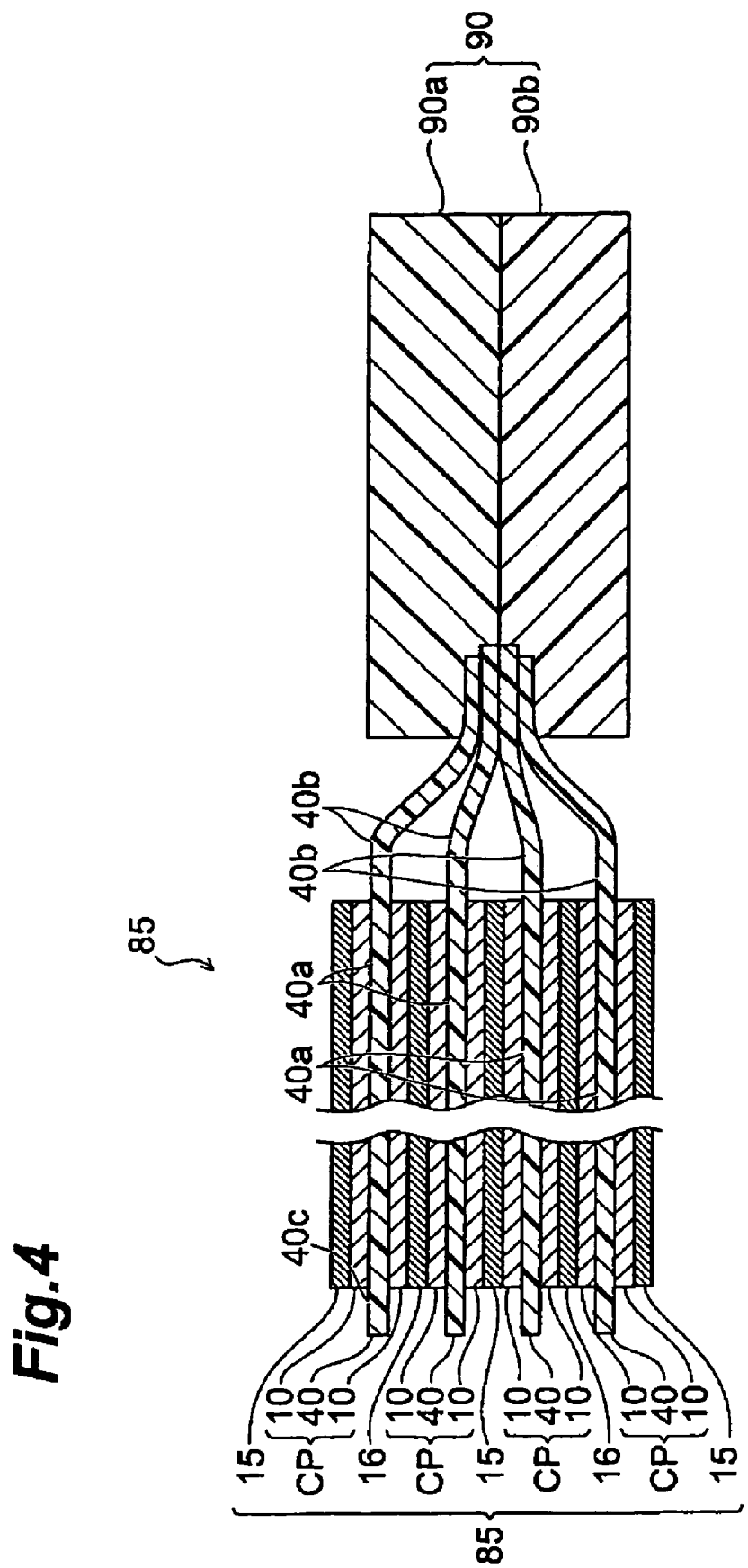
FIG. 4 is a schematic sectional view of the multilayer structure taken along the line IV-IV of FIG. 2.
Figure 5:
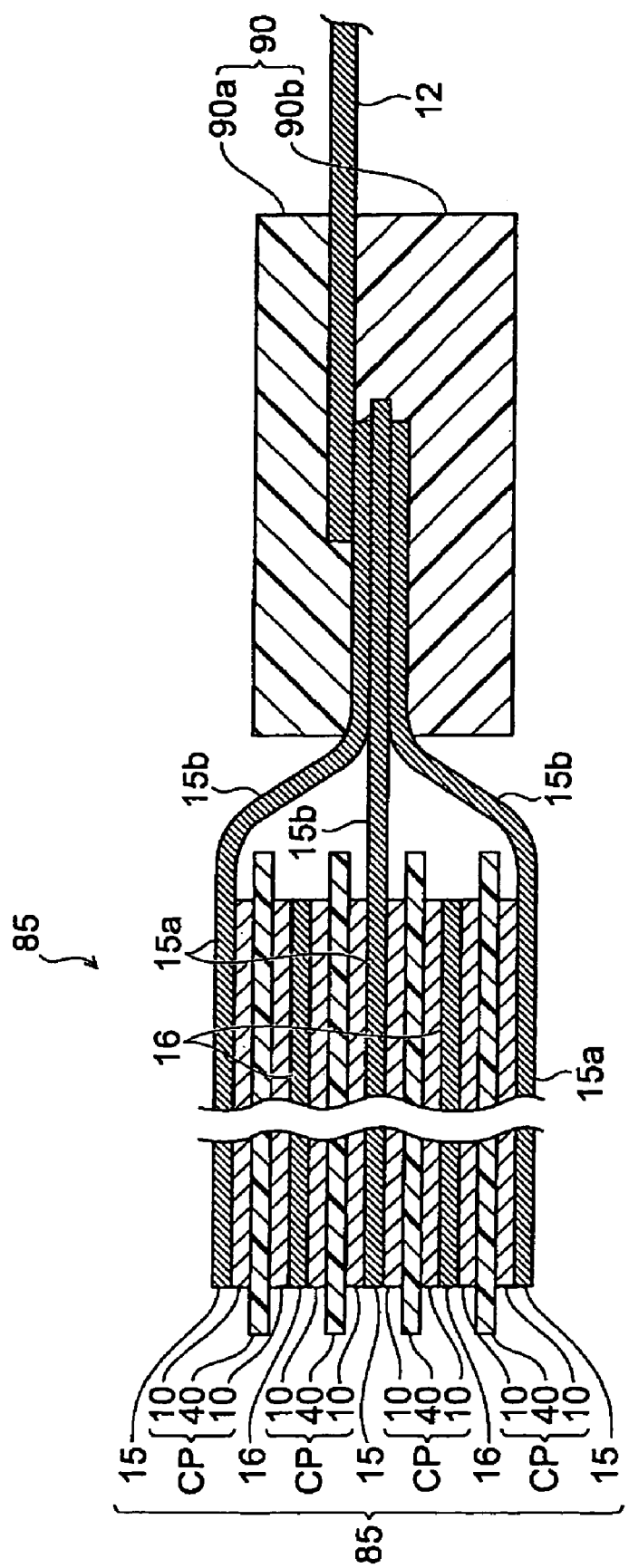
FIG. 5 is a schematic sectional view of the multilayer structure taken along the line V-V of FIG. 2.

FIG. 1 is a partly broken perspective view showing the electric double layer capacitor 100 in accordance with a first embodiment of the present invention. FIG. 2 is a plan view of the multilayer structure 87 of FIG. 1. FIG. 3 is a sectional view of the multilayer structure 87 taken along the line III-III of FIG. 2. FIG. 4 is a sectional view of the multilayer structure 87 taken along the line IV-IV of FIG. 2. FIG. 5 is a sectional view of the multilayer structure 87 taken along the line V-V of FIG. 2.

As shown in FIGS. 1 to 5, the electric double layer capacitor 100 in accordance with this embodiment is mainly constructed by a multilayer body 85, a case (outer casing) 50 containing the multilayer body 85 in a closed state, leads 12 and 22 for connecting the multilayer body 85 to the outside of the case 50, and a fixing member 90 for securing the multilayer body 85. The multilayer body 85, fixing member 90, and leads 12 and 22 constitute the multilayer structure 87.

In the multilayer body 85, as shown in FIGS. 3 to 5, a collector plate 15, an active material layer 10, a separator 40, an active material layer 10, a collector plate 16, an active material layer 10, a separator 40, an active material layer 10, a collector plate 15, an active material layer 10, a separator 40, an active material layer 10, a collector plate 16, an active material layer 10, a separator 40, an active material layer 10, and a collector plate 15 are successively laminated from the upper side.

Collector Plate

As shown in FIGS. 1 and 2, each collector plate 15 has a rectangular main part 15*a* and a tab part 15*b* which is connected to the main part 15*a* and smaller than the main part 15*a*. Similarly, as shown in FIG. 2, each collector plate 16 has a rectangular main part 16*a* and a tab part 16*b* which is connected to the main part 16*a* and smaller than the main part 16*a*. The collector plates 15, 16 are alternately stacked such that the respective main parts 15*a*, 16*a* of the collector plates 15, 16 oppose each other while the tab parts 15*b*, 16*b* of the collector plates 15, 16 align in two respective rows. Namely, when the multilayer body 85 is seen in the laminating direction as shown in FIG. 2, the tab parts 15*b* are stacked in one row, and the tab parts 16*b* are stacked in one row.

Materials for the collector plates 15, 16 are not restricted in particular as long as they are metal materials usually employed as collector plates for active material layers in electric double layer capacitors. Their examples include copper, nickel, and aluminum.

Active Material Layer

As shown in FIGS. 3 to 5, the active material layers 10 are formed on the respective surfaces of the main parts 15*a*, 16*a* of the collector plates 15, 16, and are attached to their corresponding collector plates 15, 16. The active material layers 10 are also in contact with the surfaces of the separators 40.

Each active material layer 10 is a layer containing an active material, a conductive auxiliary agent, a binder, and the like. The active material is not restricted in particular, whereby materials which can construct polarizable electrodes such as carbon electrodes employed in known electric double layer capacitors can be used. For example, carbon materials (e.g., activated carbon) obtained by activating coking coke (e.g., petroleum coke manufactured by a delayed coker from material oils such as bottom oils of fluidized catalytic crackers for petroleum-based heavy oils and residual oils of vacuum distillers) can be used as a main ingredient for a constituent material.

The conductive auxiliary agent is not restricted in particular as long as it ameliorates the conductivity of the active material layer 10, whereby known conductive auxiliary agents can be used. Its examples include carbon materials such as carbon blacks and powder graphite, fine powders of metals such as aluminum and stainless steel, and mixtures of the carbon materials and fine powders of metals.

The binder is not restricted in particular as long as it can connect particles of the active material and conductive auxiliary agent together and bind them as an active material layer to the collector plates 16, whereby known binders can be used. Examples of the binder include polyvinylidene fluoride (PVDF), polytetrafluoroethylene (PTFE), polyethylene (PE), polypropylene (PP), and fluorine rubber.

Separator

Each separator 40 is arranged between the active material layers 10, 10 formed on the respective collector plates 15, 16. As shown in FIGS. 2 to 5, the end faces of the separators 40 project out of the end faces of the active material layers 10 and the main parts 15a, 16a of the collector plates 15, 16. Specifically, as shown in FIG. 2, each separator 40 has a main part 40a, a shorter tab part 40b, and a longer tab part 40c.

The main part 40a is arranged between the respective active material layers 10, 10 of the collector plates 15, 16, and has the same area and form as those of each active material layer 10.

The shorter tab part 40b is provided along the outer periphery of the main part 40a, and protrudes outward by the length of 40bL from between the main parts 15a, 16a of the collector plates 15, 16 as shown in FIGS. 2 to 5. The shorter tab part 40b reduces the short circuit between the active material layers 10, 10 holding the separator 40 therebetween.

The longer tab part 40c is provided on the outside of the main part 40a, and projects to the gap between the respective rows of the tab parts 15b, 16b of the collector plates 15, 16. The longer tab part 40c projects by the length of 40cL from between the main parts 15a, 16a of the collector plates 15, 16. The length 40cL of the longer tab part 40c is longer than the length 40bL of the shorter tab part 40b.

The width 40W of the longer tab part 40c is smaller than the gap 15W between the respective rows of the tab parts 15b, 16b of the collector plates 15, 16.

The material for the separators 40 is not limited in particular as long as it is an electrically insulating porous body, whereby separators employed in known electric double layer capacitors can be used. Examples of the electrically insulating porous bodies include multilayer bodies of films constructed by polyethylene, polypropylene, or polyolefin, extended films of mixtures of these resins, and nonwoven fabrics of fibers constructed by at least one kind of constituent material selected from the group consisting of cellulose, polyester, polyacrylonitrile, and polypropylene.

Electrolyte

The electrolyte is contained in the active material layers 10 and within pores of the separators 40. The electrolyte is not restricted in particular, whereby electrolytes employed in known electric double layer capacitors (aqueous electrolytic solutions and nonaqueous electrolytic solutions using organic solvents) can be used. Here, electrolytes using organic solvents (nonaqueous electrolytes) are preferred. As the electrolyte, one in which an ammonium salt is dissolved in a nonaqueous solvent (organic solvent) is preferably used.

Though not restricted in particular, the kind of electrolyte solution is chosen in view of the solubility and degree of dissociation of the solute and the viscosity of the liquid in general, and is desirably an electrolyte solution having a high conductivity and a high potential window (high decomposition starting voltage). As a typical example, a solution of a quaternary ammonium salt such as tetraethylammonium tetrafluoroborate (TEA) in an organic solvent such as propylene carbonate, diethylene carbonate, or acetonitrile is used. In this case, moisture contamination must be controlled strictly.

In this embodiment, the electrolyte may be not only a liquid one but also a gelled electrolyte obtained by adding a gelling agent thereto. Instead of the electrolyte, a solid electrolyte (an electrolyte constituted by a solid polymer electrolyte or ionically conductive inorganic material) may be contained as well.

As shown in FIGS. 3 to 5, one separator 40, a pair of active material layers 10, 10 holding the separator therebetween, and the electrolyte constitute a unit capacitor cp.

Lead

As shown in FIG. 1, the leads 12, 22 each having a ribbon-like outer form project from within the case 50 to the outside through a seal part 50b.

The leads 12, 22 are formed from a conductor material such as a metal. Aluminum is desirably used as the conductor material.

The end part of the lead 12 within the case 50 is connected to respective end parts of the tab parts 15b of the collector plates 15 by resistance welding or the like, whereby the lead 12 is electrically connected to the active material layers 10 through the collector plates 15.

On the other hand, as shown in FIGS. 1 to 3, the end part of the lead 22 within the case 50 is connected to respective end parts of the tab parts 16b of the collector plates 16 by resistance welding or the like, whereby the lead 22 is electrically connected to the active material layers 10 through the collector plates 16. The leads 12 and 22 are separated from each other in a direction orthogonal to the laminating direction of the multilayer body 85.

Fixing Member

As shown in FIGS. 1 to 5, the fixing member 90 is one in which rectangular sheets 90a, 90b are stacked in the laminating direction of the collector plates 15, 16 and fused together by heating. As shown in FIGS. 1 to 5, the fixing member 90 holds the end part of the lead 12 on the multilayer body side, the tab parts 15b of the collector plates 15 stacked with respect to the lead 12, the end part of the lead 22 on the multilayer body side, the tab parts 16b of the collector plates 16 stacked with respect to the lead 22, and the longer tab parts 40c of the separators 40 between the sheets 90a, 90b.

Namely, the fixing member 90 is bonded to the tab parts 16b, longer tab parts 40c, and tab parts 15b, and secures them to each other. The fixing member 90 also covers the parts of leads 12 and 22 on the tab part side.

The material for the fixing member 90 is not limited in particular as long as it is an insulator, but is preferably formed from a synthetic resin. The fixing member 90 is preferably made of a thermoplastic resin in particular because of its easiness in bonding to the tab parts 15b, 16b and longer tab parts 40c. Acid-denatured polyolefins such as acid-denatured polypropylene and acid-denatured polyethylene are preferred in particular because of their high adhesion to metals.

Case

The case 50 is not limited in particular as long as it can seal the multilayer body 85 and prevent the air and moisture from entering the case, whereby cases employed in known electric double layer capacitors can be used. For example, a metal sheet such as aluminum whose inner and outer faces are respectively laminated with a thermoplastic resin such as PP and a resin such as PET can be used. In this embodiment, as shown in FIG. 1, the case 50 is formed by folding a rectangular flexible sheet 51C into two parts at a substantially longitudinal center part, whereby the multilayer body 85 is held from both sides of the laminating direction (vertical direction). In the end parts of the folded sheet SIC, the seal parts 50b in three sides other than the fold part 50a are bonded by heat sealing or with an adhesive, whereby the multilayer body 85 is sealed therein. The case 50 holds the fixing member 90 at the seal parts 50b, so as to be bonded thereto.

Manufacturing Method

An example of method of making the electric double layer capacitor 100 will now be explained.

First, a coating liquid (slurry) for forming active material layers 10 on collector plates is prepared. The coating liquid for the active material layers is a liquid in which the above-mentioned active material, conductive auxiliary agent, binder, and the like are dispersed in a solvent. The solvent employed in the coating liquid is not limited in particular as long as it can dissolve the binder and disperse the active material and conductive auxiliary agent. N-methyl-2-pyrrolidone, N,N-dimethylformamide, or the like can be employed when PVDF is used for the binder, for example.

Figure 6:
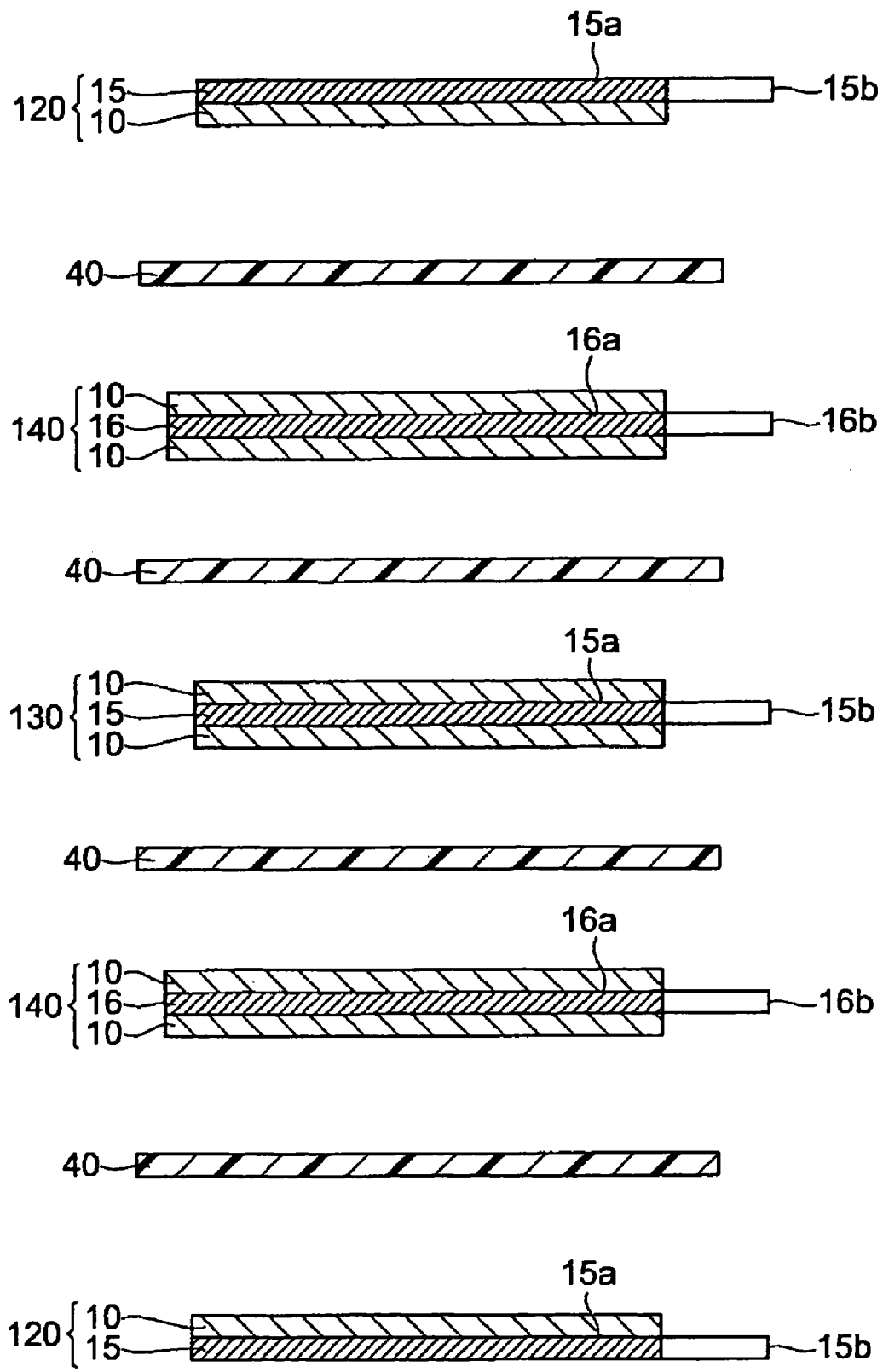
FIG. 6 is a sectional view showing a step of manufacturing the electric double layer capacitor of FIG. 1.

Next sheets such as aluminum and etching aluminum foils for collector plates are prepared. The coating liquid is applied onto one face of each sheet for the collector plate and then is dried, so as to form an active material layer. Thereafter, thus obtained product is cut out into forms each having a main part 15a and a tab part 15b, whereby two double layer electrodes 120 each having the active material layer 10 formed on one face of the main part 15a as shown in FIG. 6 are obtained. Similarly, the coating liquid is applied to both faces of a collector plate sheet and then is dried, so as to form active material layers on both faces. Thereafter, thus obtained product is cut out into a form having a main part 15a and a tab part 15b, so as to yield a three-layer electrode 130 having active material layers 10 formed on both faces of the collector plate sheet as shown in FIG. 6. Similarly, two 3-layer electrodes 140 each having a main part 16a, a tab part 16b, and active material layers 10 formed on both faces of the main part 16a are obtained. Here, the technique for applying the coating liquid to the collector plates is not limited in particular and can appropriately be determined according to the material, form, and the like of the sheets for collector plates. Examples of the technique include metal mask printing, electrostatic deposition, dip coating, spray coating, roll coating, doctor blading, gravure coating, and screen printing. Thus coated layers are extended by a platen press, calender rolls, or the like if necessary. Both faces of the tab parts 15b, 16b are free of the active material layers 10.

Subsequently, separators each having a main part 40a, a shorter tab part 40b, and a longer tab part 40c are prepared. Specifically, the separators are made by cutting out an insulating porous material into a predetermined size and form.

Figure 7:
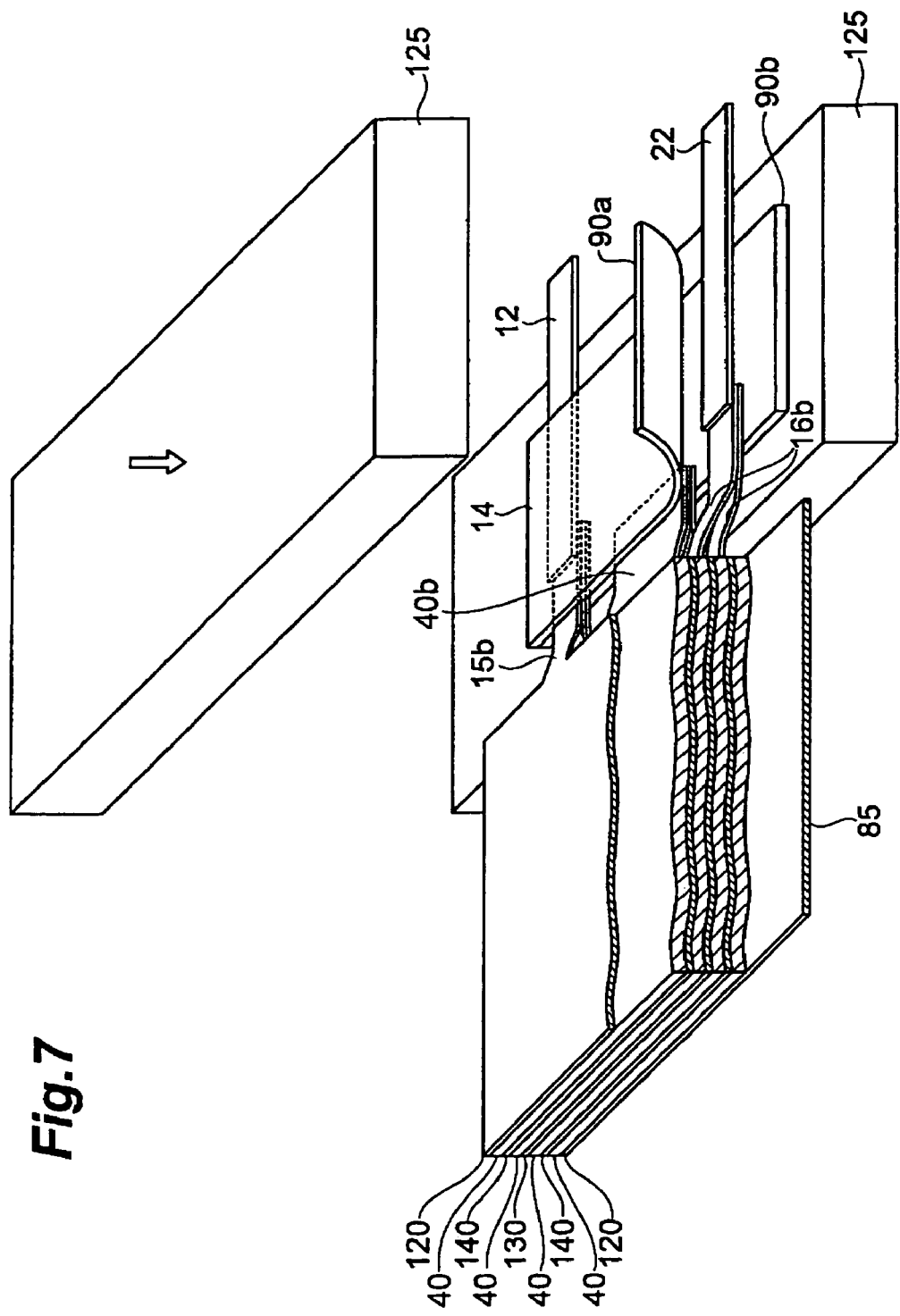
FIG. 7 is a perspective view showing a step of manufacturing the electric double layer capacitor of FIG. 1 subsequent to FIG. 6.

Next, the double layer electrodes 120, three-layer electrode 130, and three-layer electrodes 140 are laminated so as to alternate with the separators 40 in the order of FIG. 6, i.e., in the order of the double layer electrode 120, separator 40, three-layer electrode 140, separator 40, three-layer electrode 130, separator 40, three-layer electrode 140, separator 40, and double layer electrode 120, so as to yield a multilayer body 85 as shown in FIG. 7. Here, each separator 40 is arranged such that the respective active material layers 10 are in contact with both sides thereof. Also, the tab parts 15b are aligned in one row, the tab parts 16b are aligned in one row at positions different from the tab parts 15b, and the longer tab parts 40c of the separators 40 are arranged between the rows of the tab parts 15b, 16b.

Then, as shown in FIG. 7, end parts of the tab parts 15b are stacked and welded to an end part of a lead 12, and end parts of the tab parts 16b are stacked and welded to an end part of a lead 22.

Subsequently, sheets 90a, 90b are prepared. The tab parts 15b, the tab part side of the lead 12, the longer tab parts 40c, the tab parts 16b, and the tab part side of the lead 22 are held with the sheets 90a, 90b from both sides, and the sheets 90a, 90b are thermally fused with heat sealers 125, 125, so as to unite the sheets 90a, 90b together and bond them to the tab parts, thereby forming the fixing member 90.

Figure 8:
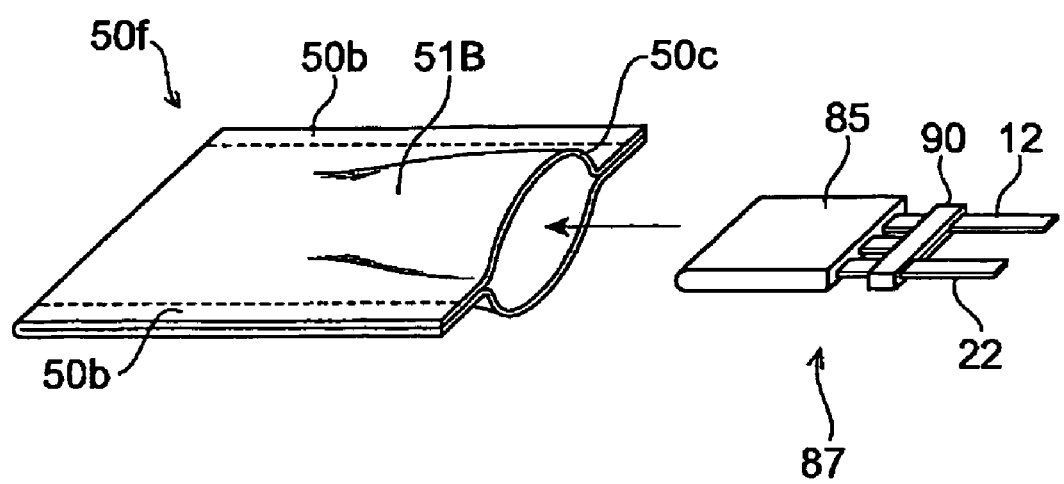
FIG. 8 is a perspective view showing a step of manufacturing the electric double layer capacitor of FIG. 1 subsequent to FIG. 7.

This completes a multilayer structure 87 having the multilayer body 85, fixing member 90, and leads 12 and 22 as shown in FIG. 8.

Subsequently, as shown in FIG. 8, a rectangular sheet formed by laminating both faces of an aluminum foil with a resin is folded into two parts, and seal parts 50b of two sides other than an opening 50c is heat-sealed with the heat sealers, so as to form a case 50f.

Then, the multilayer structure 87 is inserted into the case 50 from the opening 50c in the remaining one side. Subsequently, the electrolyte is injected into the case 50f in a vacuum container, so that the multilayer body 85 is dipped into the electrolyte. Thereafter, each of the leads 12, 22 is projected out from within the case 50f, and the opening 50c of the case 50f is sealed with the heat sealers while in a state where the fixing member 90 is held in the opening 50c. This completes the making of the electric double layer capacitor 100.

Effects

In such an electric double layer capacitor 100, the fixing member 90 secures the tab parts 15b, 16b of the collector plates 15, 16 to the longer tab parts 40c of the separators 40, whereby the separators 40 and the collector plates 15, 16 are secured to each other. This makes it easier to handle the multilayer body 85 including the separators 40 and collector plates 15, 16 at the time of manufacture. Consequently, in the steps of inserting the multilayer body 85 into the case 50 and then sealing the case 50 or the like, the collector plates 15, 16 and the separator 40 are less likely to be misaligned and so forth in the multilayer body 85, whereby defects such as short circuits between the collector plates are restrained from occurring.

The fixing member 90 secures the tab parts 15b, 16b of the collector plates 15, 16 to the longer tab parts 40c of the separators 40. Therefore, the fixing member 90 does not decrease the area of interfaces between the active material layers 10 and separators 40, and is less likely to inhibit ions from migrating and so forth in the electrolyte, whereby the internal resistance of the electric double layer capacitor 100 can be lowered. Moreover, configured fixing member 90 is hard to affect the thickness of the multilayer body or electrochemical device, and thus can contribute to thinning the electric double layer capacitor 100.

The tab parts 15b, 16b alternate with each other in two rows, whereas the longer tab parts 40c of the separators 40 project to the gap between the respective rows of the tab parts 15b, 16b. Since the fixing member 90 secures thus arranged tab parts 15b, 16b and longer tab parts 40c, the size of the fixing member 90 becomes relatively small, which is favorable.

The fixing member 90 has such a form and size that it does not overlap the main parts 15a, 16a of the collector plates 15, 16 when the electric double layer capacitor 100 is viewed in a direction perpendicular to the collector plates 15 and the like. This is favorable in that the fixing member 90 does not hinder the main parts 15a, 16a of the collector plates 15, 16 from being heat-pressed from the outside of the case 50 after the multilayer body 85 is sealed into the case 50.

Since the width 40W of the longer tab parts 40c is shorter than the gap 15W between the respective rows of the tab parts 15b, 16b, the protruded parts 40c of the separators 40 are not held between the upper and lower tab parts in each of the rows of the tab parts 15b, 16b. Therefore, even when the length of projection 40cL of the tab parts 15b, 16b is made shorter, the tab parts 15b, 16b are electrically connected in the respective rows, and thus can easily be connected to their corresponding leads 12, 22.

The fixing member 90 is bonded to the tab parts 15b, 16b of the collector plates 15, 16 and to the longer tab parts 40c of the separators 40, whereby they are secured to each other. Therefore, a small fixing member enables reliable fixing.

The fixing member 90 is made of a thermoplastic resin and thus can easily be bonded to the tab parts 15b, 16b and longer tab parts 40c by thermal fusion.

Since the fixing member 90 is one in which two sheets 90a, 90b opposing each other in the laminating direction of the collector plates 15, 16 are bonded to each other, while the respective tab parts 15b, 16b of the collector plates 15, 16 and the longer tab parts 40c of the separators 40 are held between the sheets 90a, 90b, the fixing operation is easy.

The leads 12, 22 are connected to their corresponding tab parts 15b, 16b, whereas the fixing member 90 further covers the leads 12, 22. When sealing the multilayer structure 87 into the case 50, the case 50 is thermally fused so as to hold the fixing member 90. Consequently, the fixing member 90 can also act as a cover made of a resin or the like for improving the airtightness between the case 50 and leads 12, 22, which is favorable in terms of economy.

Without being restricted to the above-mentioned embodiment, the present invention can be modified in various modes.

For example, though the fixing member 90 secures the longer tab parts 40c of the separators 40 to the tab parts 15b, 16b of the collector plates 15, 16 in the above-mentioned embodiment, the shorter tab parts 40b of the separators 40 may be secured to the tab parts 15b, 16b of the collector plates 15, 16.

Though the fixing member 90 covers the leads 12, 22 in the above-mentioned embodiment, the present invention can be realized even when the leads 12, 22 are not covered. In this case, before the leads 12, 22 are connected to the respective rows of the tab parts 15b, 16b, the fixing member 90 may connect the longer tab parts 40c to the tab parts 15b, 16b. When the fixing member 90 does not cover the leads 12, 22, a highly airtight seal can be obtained by cladding the leads 12, 22 with a cover made of a resin or the like different from the fixing member and then thermally bonding this cover to the case.

The tab parts 15b, 16b are arranged in alternate rows in the above-mentioned embodiment. When the total number of collector plates is 2 or the like, a mode in which the tab parts 15b, 16b oppose each other while holding therebetween a longer tab part 40c of a separator can also be realized.

Though the above-mentioned embodiment comprises four unit capacitors cp, the number of unit capacitors cp may be more than 4, or 3 or less, e.g., 1.

Though the collector plates 15, 16 have such forms that the fixing member 90 does not overlap the collector plates 15, 16 when viewed in the laminating direction of the collector plates 15, 16, the present invention can also be realized even when they overlap each other.

Though the above-mentioned embodiment secures the tab parts 15b, 16b and longer tab parts 40c to each other by bonding the fixing member 90 to the tab parts 15b, 16b and longer tab parts 40c, the present invention can also be realized when a fixing member such as clip holds the tab parts 15b, 16b and longer tab parts 40c together so as to secure the tab parts 15b, 16b and longer tab parts 40c, for example.

Though the above-mentioned embodiment relates to an electric double layer capacitor, the present invention is not limited to the electric double layer capacitor, but is also employable in capacitors such as pseudocapacitors and redox capacitors, for example.

The present invention is also employable in batteries such as lithium-ion secondary batteries without being restricted to capacitors. In the case of a lithium-ion secondary battery, for example, the active material layer on one side of a separator is a negative electrode active material layer, whereas the active material layer on the other side of the separator is a positive electrode active material layer. An example of the negative electrode active material is a carbon material having a graphite structure. Examples of the positive electrode active material include mixed metal oxides such as lithium cobaltate ($LiCoO_2$), lithium nickelate ($LiNiO_2$), lithium manganese spinel ($LiMn_2O_4$), those represented by a general formula of $LiNi_xCo_yMn_zO_2$ (x+y+z=1), lithium vanadium compound ($LiV_2O_5$), olivine-type $LiMPO_4$ (where M is Co, Ni, Mn, or Fe), and lithium titanate ($Li_4Ti_5O_{12}$). An example of the electrolyte is a nonaqueous electrolyte containing a salt including a lithium ion.

The present invention will now be explained in detail with reference to an example and comparative examples, but will not be restricted to the example at all.

EXAMPLE 1

To begin with, an active material coating material was made with a weight composition of activated carbon/carbon black (conductive auxiliary agent)/PVdF (binder)=87/3/10, and was applied onto an etching aluminum foil having a thickness of 20 μm, so as to form a coated part in a portion thereof. After drying the coating, roll pressing was effected, so as to make a double layer electrode sheet having a structure of collector plate/active material layer, and a three-layer structure of active material layer/collector plate/active material layer. Subsequently, these sheets were punched out with dies, so as to form a double layer electrode including a collector plate having a tab part and a main part with an active material layer formed on one face of the main part, and a three-layer electrode including a tab part and a main part with active material layers formed on both faces of the main part. The thickness of the double layer electrode including the main part and active material layer was 45 μm, whereas the thickness of the three-layer electrode including the main part and two active material layers was 70 μm. The size of each main part was 7.80×7.80 mm, whereas the size of each tab part was 2.0×2.0 mm.

Subsequently, an electrolyte sheet made of regenerated cellulose having a thickness of 30 μm was punched out so as to have a rectangular area (corresponding to a main part and a shorter tab part) of 8.2×8.2 mm and a longer tab part of 2.0×2.5 mm, thus yielding a separator.

Then, they were laminated so as to yield a structure of double layer electrode/separator/three-layer electrode/separator/three-layer electrode/separator/double layer electrode, thereby forming a multilayer body. Here, the electrodes and separators were arranged such that the tab parts of the collector plates were alternately arranged in two rows, and the tab parts of the separators were placed between the rows of the tab parts.

Thereafter, the tab part group of electrodes on one side was ultrasonically fused to one lead, whereas the tab part group of electrodes on the other side was ultrasonically fused to the other lead. Subsequently, two acid-denatured propylene films (each having a thickness of 30 μm, a width of 3.0 mm, and a length of 10.0 mm) adapted to bond a metal and a resin to each other were prepared, and were arranged such as to hold therebetween the tab part group on one side, the tab part group on the other side, their corresponding leads, and the respective longer tab parts of the separators in the laminating direction. Then, the two films were sealed with heat sealers, so as to be bonded together, thus forming a fixing member. Here, 0.2-mm portions in the tab parts of the separators were held with the fixing member. This yielded a multilayer structure. Heat sealing was effected by applying a pressure of $10 \times^4$ Pa at a temperature of 175° C. for 15 seconds. The acid-denatured polypropylene films did not overlap the main parts of the electrodes and the main parts of the separators.

A case was prepared by folding an aluminum laminate film having a thickness of 85 μm into two parts. The multilayer structure was held in this case, and two sides of an entrance part of the case were heat-sealed such that the fixing member was held by the aluminum laminate film. Thereafter, the case was dried for 12 hours in a vacuum dryer at 160° C., and then, with a polycarbonate solution containing 1.0 mol/L of TEA-BF$_4$ added thereto, the remaining side was heat-sealed under reduced pressure. Thereafter, the main part of the multilayer body was pressed at a pressure of $4.9 \times 10^4$ Pa from the outside of the case by a platen press heated at 80° C. The final thickness of the electric double layer capacitor was about 490 μm.

COMPARATIVE EXAMPLE 1

An electric double layer capacitor was obtained as in Example 1 except that heat sealing was effected in a state without holding the longer tab parts of the separators between the two sheets when forming the fixing member.

COMPARATIVE EXAMPLE 2

An electric double layer capacitor was obtained as in Example 1 except that one round of an adhesive tape made of polyimide having a thickness of 65 μm was wound about the outer periphery of the multilayer body before forming the fixing member after laminating the multilayer body.

In each of the example and comparative examples, five electric double layer capacitors were obtained by the same method.

In each of the example and comparative examples, after a voltage of 2.7 V was applied for 6 hr in an environment at 70° C., the electric double layer capacitors were discharged to 0 V. Thereafter, the ESR (equivalent series resistance) and capacity of each electric double layer capacitor were measured in an environment at 25° C. Further, after a voltage of 2.5 V was applied for 1 hr in the environment at 25° C., the electric double layer capacitor was left for 48 hr, and then the voltage between terminals was measured, so as to yield a holding voltage. Furthermore, the thickness of each electric double layer capacitor was measured. FIG. 9 shows the results.

In Example 1 in which the fixing member secured the tab parts of the collector plates to the longer tab parts of the separators, the equivalent series resistance corresponding to the internal resistance was sufficiently low, the capacity was uniform, the holding voltage was sufficient, and the thickness was sufficiently small.

In Comparative Example 1 in which the fixing member secured only the tab parts of the collector plates without bonding the longer tab parts, there was a sample causing a short circuit. It seems that, since the collector plates and separators were not secured, the multilayer body was harder to handle, whereby the electrodes and separators were misaligned.

In Comparative Example 2 in which the outer periphery of the multilayer body was secured with the adhesive tape, the thickness of the electric double layer capacitor was not sufficiently small, and the holding voltage decreased. The drop in holding voltage seems to have been caused by a large pressure exerted on a part under the adhesive tape in the final pressing of the main part with the platen press, which thinned the separators and the like in this part.

What is claimed is:

1. An electrochemical device comprising:
    a pair of collector plates, each having a main part and a tab part, arranged such that the main parts oppose each other, wherein the tab parts do not oppose each other;
    a separator having a main part and a tab part, the separator being arranged such that the main part is disposed between the main parts of the pair of collector plates while the tab part of the separator projects out from between the main parts of the pair of collector plates, wherein the tab part of the separator is projected into a gap between the two tab parts of the collector plates;
    an active material layer formed on the main part of each collector plate and in contact with the separator;
    an electrolyte in contact with each active material layer; and
    an insulative fixing member securing the tab part of each collector plate and the tab part of the separator to each other,
    wherein the tab part of the separator has a width smaller than the gap between the two tab parts of the collector plates.

2. An electrochemical device comprising:
    at least three collector plates, each having a main part and a tab part, wherein the collector plates are stacked such that the main parts thereof oppose each other while the respective tab parts thereof are alternatively aligned in two rows;
    separators each having a main part and a tab part, the separators being arranged such that the main parts thereof are each disposed between the main parts of the collector plates while the tab parts of the separators each projects out from between the main parts of the collector plates,
    active material layers each formed on a respective one of the main parts of the collector plates and in contact with a respective one of the separator;
    an electrolyte in contact with each active material layer;
    an insulative fixing member that secures the tab parts of each of the collector plates- and the tab parts of the separators to each other,
    wherein the tab parts of the separators are projected into a gap between the two rows of the tab parts of the collector plates; and
    wherein the tab parts of the separators have a width smaller than the gap between the two rows of the tab parts of the collector plates.

* * * * *